2,798,089

SULFONATION OF BENZENE

Samuel L. Norwood, College Park, Walter H. C. Rueggeberg, Atlanta, and Thomas W. Sauls, College Park, Ga., assignors to Tennessee Corporation, New York, N. Y., a corporation of New York No Drawing. Application November 29, 1954, Serial No. 471,926

4 Claims. (Cl. 260—505)

This invention relates to an improved process for the production of benzene sulfonic acid by the sulfonation of benzene with sulfur trioxide dissolved in liquid sulfur dioxide.

Sulfonations with sulfur trioxide in liquid sulfur dioxide must be performed at temperatures of about —9° C. to —10° C., unless pressure equipment is to be used. On the other hand, although pure anhydrous benzene sulfonic acid has a melting point of about 66° C., it forms a solid complex with $SO_2$ at lower temperatures and this complex is very difficult to melt. When benzene sulfonic acid is produced under atmospheric pressure and at about —9° C. by sulfonation with $SO_3$ in liquid $SO_2$, therefore, the problem arises of reaching the melting point of the acid mixture, say about 60° C., without the formation of such a complex.

One approach to the above problem is to perform the sulfonation with continuous flow of the reaction products into a charge of molten benzene sulfonic acid maintained at 60–65° C. while drawing off acid at the bottom for further stripping of $SO_2$, but this method has the undesirable feature of requiring very close control. Another approach is to provide components such as sulfuric acid or acetic acid to lower the freezing point, but the amounts of such materials that can be used in practice are inadequate to solve the problem.

In processes embodying the present invention, the benzene to be sulfonated is divided into two fractions, one of which is mixed with the total amount of the $SO_3$—$SO_2$ sulfonating agent in a first sulfonation stage maintained at low temperature, and the other of which is added to the reaction mixture in a second sulfonation stage at higher temperature. Accordingly there is a substantial excess of $SO_3$ above the amount required to form benzene sulfonic acid in the first stage which might be expected to result in disulfonation. But benzene is not as easily sulfonated as toluene and its larger homologs, due to the activating effect of the alkyl groups on the benzene nucleus, and it has been observed that when benzene is added to a large excess of $SO_3$ dissolved in liquid $SO_2$ at a temperature of about —9° C., no noticeable amount of disulfonation takes place. On the contrary, the excess $SO_3$ results in the formation in the first stage of a substantial amount of benzene pyrosulfonic acid, which is later converted to benzene sulfonic acid by the addition of the remaining benzene in the second stage. The chemical reactions taking place can be represented as follows:

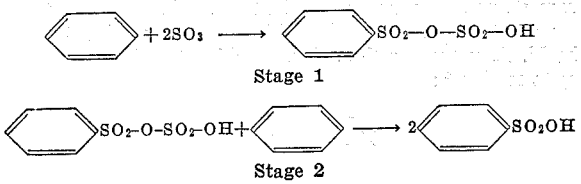

The two-stage sulfonation procedure illustrated by the above reactions has the advantage that it practically eliminates the difficulties of solidification heretofore encountered as explained above.

It has been found that reaction mixtures formed in the first stage and containing a substantial amount of excess $SO_3$ in the form of benzene pyrosulfonic acid will not solidify upon warming from —9° C. up to 20° C. even when seeded. During such warming some of the $SO_2$ is removed from the mixture. If the second fraction of benzene is added rapidly to such a mixture at 10° C. to 20° C., the second stage reaction takes place and the heat of the reaction quickly raises the temperature to 40–50° C., any slush that tends to form being melted to a clear liquid. A small amount of additional heat further raises the temperature to 60–65° C. at which freezing cannot occur. Stripping of the remaining $SO_2$ can then be effected in any desired manner.

Excess $SO_3$ causes a tendency toward disulfonation and accordingly is usually to be avoided, the total $SO_3$ being in approximately molar proportion to the total benzene. It will be evident from the above reactions, moreover, that the benzene fraction reserved for the second stage should not be greater than about 50% of the total benzene, as otherwise the amount of $SO_3$ in the first stage will be in excess of that which can be combined in the form of benzene pyrosulfonic acid. On the other hand, this first benzene fraction may be considerably more than 50%, acceptable results having been obtained when as small a fraction as 20% is reserved for the second stage and the remaining 80% is used in the first stage. Beyond 80%, however, operating difficulties are encountered and while operation at 90% may be possible, the limit is about 80% for practical operation.

It has been reported that when benzene and $SO_3$ vapors react, there is an increased tendency toward sulfone formation and accordingly we prefer to introduce the benzene below the surface of the $SO_3$—$SO_2$ sulfonating medium. Also the presence of an organic acid such as acetic acid in small amount (up to 2%) lowers the amount of sulfone formation, as disclosed and claimed in our copending application Serial No. 454,201, filed September 3, 1954, and entitled "Processes for Producing Anhydrous Aromatic Sulfonic Acids with Low Sulfone Content and the Products Thereof."

The benzene sulfonic acid may be stripped of remaining $SO_2$ in any desired manner. A convenient procedure is to sweep air over the hot agitated acid (60°–65° C.), and tests have shown that five minutes of such sweeping reduces the amount of $SO_2$ in the product to 0.015%. On the other hand, benzene sulfonic acid is hygroscopic and may absorb moisture from the sweeping air, the average amount of air absorbed during five minutes sweeping with ordinary room air being 0.5–1%. Where this is excessive the air may be predried and/or the time of sweeping limited, or any other desired stripping method may be employed.

The essentially anhydrous product obtained as set forth above melted at 58° C. to 60° C. By adding small increments of water, a eutectic point was found at about 32° C. where there was roughly 7% water present corresponding to a half hydrated sulfonic acid. It may be desirable to add this amount of water in order to get a lower melting product, in cases where it is not objectionable to lower the percentage of benzene sulfonic acid below 90%.

The improved results secured by the invention are illustrated by the data tabulated below. In making these tests the following four methods of mixing the reactants were employed as indicated in the column headed "Add'n method":

Addition of reactants:
- a. Addition of $SO_3$—$SO_2$ into benzene-$SO_2$.
- b. Two stage sulfonation: $SO_3$—$SO_2$ into first fraction of benzene-$SO_2$; second fraction benzene into above mixture after removing $SO_2$ to 10° C.; figures show relative proportions of benzene fractions.
- c. Two stage sulfonation: first fraction benzene into $SO_3$—$SO_2$; second fraction benzene into above mixture after removing $SO_2$ to 10° C.; figures show relative proportions of benzene fractions.
- d. Same as (c) except second fraction benzene added to mixture at 20° C.

The addition times varied from 5-15 minutes, and stripping of the $SO_2$ was accomplished by sweeping air over the acid while stirring at 60–65° C. for 5 minutes or longer. Catalysts or additives, when used, were in some instances put in the benzene and some instances in the $SO_2$—$SO_3$, as noted in the table.

The $SO_2$ to $SO_3$ ratio throughout the tests was about 8:1 which appears to be about the optimum from the economic point of view. Reduction of the ratio below this value tends to result in increasing losses of benzene or its sulfonic acid by entrainment and increasing amounts of by-products. Increasing the $SO_2$ to $SO_3$ weight ratio above 8 to 1 will result in smaller losses by entrainment and slight advantages of better color and less by-products, but in general the 8:1 ratio is preferred for practical purposes.

The details of run No. 24 are typical of all of the tests shown in the table. Into a 1 liter 3 neck flask containing 500 ml. liquid $SO_2$, 89.64 grams $SO_3$, and 1.8 grams glacial acetic acid, 65.6 grams nitration grade benzene were slowly added below the surface of the $SO_2$ mixture:

| Time (minutes) | T., ° C. | Remarks |
|---|---|---|
| 0 | −9 | benzene started in. |
| 12 | −9 | first stage completed. |
| 45 | −5 | thin clear liquid. |
| 51 | 0 | thin clear liquid. |
| 56 | +5 | thin clear liquid. |
| 57 | +6 | thin slush forming. |
| 61 | +10 | 2nd addition 18.8 grams benzene made quickly. |
| 62 | +39 | completed, temp. rose to 39° C., heat applied. |
| 64 | +60 | now a thin clear liquid. |
| 79 | +61 | sweeping started. |
| 83 | +63 | run weighed. |

| | |
|---|---|
| Weight of product | 173.8 grams. |
| Weight put into run | 178.94 grams. |
| Weight lost through exhaust | 5.14 grams. |
| Percent weight lost through exhaust | 2.87. |
| Melting point of acid | 60° C. |
| Color | Pink to tan. |
| Sulfone | 2.18%. |
| $H_2SO_4$ | 1.52%. |
| Neutralization equivalent | 6.47 me./grams. |
| AcOH | 1.00%. |
| Benzene sulfonic acid | 94.60%. |
| $H_2O$ (difference) | .70%. |

The following analytical procedures were used to determine the composition of the reaction mixtures as set forth bove and in the table:

1. NEUTRALIZATION EQUIVALENT

Approximately 5 grams of the molten and well mixed sulfonic acid is weighed (±.001 g.) into a 250 m. volumetric flask and diluted to 250 ml. with distilled water, the flask being then inverted 50 times or more to insure through mixing. Two 25 ml. aliquots are pipetted into 400 ml. beakers and titrated with 0.1 N NaOH solution to a permanent pink color of phenolphthalein indicator.

Neutralization equivalent =

$$\frac{\text{ml.NaOH} \times \text{N NaOH}}{\text{wt. of sample g./10}} = \text{me./gram}$$

Because of the use of acetic acid as a catalyst a correction must be applied to the me./g. value as determined above. The milli-equivalents of acetic acid per gram of sample amounts to 0.167 and subtraction of this value from the total me. determined above gives a corrected result to be used in calculating the amount of benzene sulfonic acid as set forth below.

2. SULFONE DETERMINATION

A 50 gram sample of molten, well mixed sulfonic acid is weighed out in a 600 ml. beaker (±0.1 g.), dissolved in 250 ml. distilled water, and neutralized to just a permanent pink color of phenolphthalein with 25% NaOH solution. After cooling to 15–20° C. this solution is extracted with 100 ml. diethyl ether, and after removal of the ether layer the aqueous solution is extracted twice again with 50 ml. portions of ether. The combined ether extracts are then washed by shaking with 50 ml. cool water. The total aqueous solution, including the wash water, is warmed to remove ether and saved for the sulfuric acid analysis.

The ether is evaporated from the extract containing the sulfone in a tared 250 ml. Erlenmeyer flask which is then placed in the oven at 120° C. until constant weight is reached (to 0.01 g.). After cooling in a desiccator the flask is weighed (±0.01 g.).

$$\text{Percent sulfone} = \frac{\text{weight sulfone g.} \times 100}{50}$$

3. SULFURIC ACID DETERMINATION

The aqueous solution from section 2 is transferred from the beaker used to boil out the ether to a 500 ml. volumetric flask and brought to volume with washings from the beaker, after which two 50 ml. aliquots are each acidified with 1 ml. concentrated HCl and then diluted to 350 ml. with distilled water and placed on the hot plate.

When the temperature nears the boiling point, 20 ml. of 10% $BaCl_2$ solution is added to each sample to precipitate $BaSO_4$. After digesting the samples for 45 minutes just below the boiling point, the $BaSO_4$ is filtered through a double No. 40 Whatman 12.5 cm. fluted filter paper. The beaker and precipitate are then washed 12 times with a small stream of hot water from a wash bottle.

The samples are ignited in crucibles at 700° C. in a muffle furnace with the door cracked open to prevent reduction of the $BaSO_4$. The $BaSO_4$ is weighed and the percent $H_2SO_4$ calculated as follows:

$$\text{Percent } H_2SO_4 = \frac{\text{wt. } BaSO_4 \text{ g.} \times 0.42 \times 100}{5}$$

4. TOTAL BENZENE SULFONIC ACID (BSA)

The total amount of benzene sulfonic acid is calculated from its neutralization equivalent (N. E.), using for this purpose the corrected value of N. E. from section 1 less the N. E. value for the sulfuric acid determined according to section 3:

$$\text{N.E.} \times \frac{158}{10} = \text{percent BSA}$$

The results obtained as set forth above are summarized in the following table:

SUMMARY

| Run No. | Add'n Method | Mole Ratio SO₃: Benzene | Catalysts Used | Percent Wt. Lost Via Exhaust | Percent Sulfone | Percent H₂SO₄ | N. E. (me./g.) | Percent BSA By Diff. | Percent BSA By N. E. Calc. | Remarks |
|---|---|---|---|---|---|---|---|---|---|---|
| 3 | a | 1.05:1.00 | 1% AcOH in Benzene. | 2.50 | 1.06 | 5.38 | | 92.5 | | Good chemically; freezes solid if seeded in going from −9 to +60°C. |
| 4 | a | 1.05:1.00 | 2% AcOH in Benzene. | 0.94 | 1.06 | 4.60 | | 92.3 | | Increased AcOH no advantage over Run No. 3. |
| 1 | a | 1.10:1.00 | 5.8% conc. H₂SO₄ in Benzene. | 2.30 | 6.40 | | | | | Sulfone very high. Freezes almost solid if seeded in going from −9 to +60°C. |
| 2 | a | 1.09:1.00 | 5.8% conc. H₂SO₄, 1% AcOH in Benzene. | 2.30 | 0.86 | 12.0 | | 86.14 | | AcOH reduces sulfone very definitely. Freezes almost solid if seeded at −9 to +60°C. percent BSA too low. |
| 6 | a | 1.15:1.00 | 1% AcOH in Benzene. | | | | | | | This excess SO₃ failed to keep mixture from freezing although it softened it considerably. |
| 8 | b 50-50 | 1.05:1.00 | ...do... | 0.30 | 5.50 | | | | | Mixture would not freeze at all when seeded at −9 to +10°C. Sulfone higher than in single stage runs. |
| 10 | b 66-34 | 1.05:1.00 | ...do... | 0.77 | 3.24 | 6.82 | | 88.84 | | Mixture would not freeze when seeded at −9 to +10°C. Sulfone reduced somewhat when compared to above run. |
| 12 | b 75-25 | 1.05:1.00 | ...do... | 1.17 | 2.60 | 5.07 | 6.80 | 91.33 | 88.50 | Mixture will become slushy when seeded at about 5°C. Stirs O. K. Melts to thin clear liquid when remainder of benzene is added. |
| 16 | c 75-25 | 1.10:1.00 | ...do... | 2.24 | 3.08 | 7.54 | 6.87 | 88.38 | 82.40 | O. K. mechanically. Excess SO₃ undesirable. Extraneous sulfonation suspected. |
| 17 | c 75-25 | 1.05:1.00 | ...do... | 3.20 | 2.80 | 5.63 | 7.03 | 90.50 | 90.30 | O. K. mechanically. 5% excess SO₃ not as detrimental. Acceptable composition. |
| 18 | c 75-25 | 1.05:1.00 | 0.5% AcOH in Benzene. | 2.05 | 3.66 | 4.47 | 6.75 | 91.0 | 91.0 | Reduction of AcOH caused definite increase in sulfone formation. |
| 19 | c 75-25 | 1.00:1.00 | 1% AcOH in Benzene. | 2.54 | 2.66 | 2.26 | 6.60 | 93.99 | 93.8 | Equimolar amounts of benzene and SO₃ appear to be best ratio. |
| 20 | c 75-25 | 1.00:1.00 | ...do... | 2.63 | 2.50 | 1.68 | 6.48 | 94.82 | 94.2 | Good reproducibility allowing for difference in humidity of air and sweeping. |
| 21 | c 75-25 | 1.00:1.00 | 1% AcOH, 0.5% Thiophene in Benzene. | 2.62 | 2.72 | 1.88 | 6.44 | 94.10 | 93.2 | Thiophene had no advantageous effect on this sulfonation. |
| 23 | c 75-25 | 1.00:1.00 | 1% AcOH in SO₃. | 2.89 | 2.58 | 2.14 | 6.51 | 94.28 | 93.2 | Equally good results by adding AcOH to SO₂-SO₃ prior to adding benzene. |
| 24 | c 75-25 | 1.00:1.00 | ...do... | 2.87 | 2.18 | 1.52 | 6.47 | 95.30 | 94.6 | Slightly better results by adding benzene below the surface to reduce vapor reaction. |
| 25 | d 80-20 | 1.00:1.00 | ...do... | 1.97 | 1.8 | 2.04 | 6.55 | 95.16 | 94.4 | Some crystallization and mixture too viscous to flow through pipe but did not stop stirrer. |
| 26 | d 90-10 | 1.00:1.00 | ...do... | 3.6 | 1.2 | 1.6 | 6.52 | 96.2 | 95.2 | Complete solidification at −6.5°C. and stopped stirrer. Thinned slightly on addition of second stage 10% benzene but re-solidified at −5°C. Heat to 50°C. to get slushy-thin liquid at 60°C. |

The remarks following the first five runs in the table illustrate the problem solved by the invention as explained above. Beginning with run No. 8, however, the two-stage sulfonation procedure of the invention was employed with good results in all except the last run No. 26 in which difficulties with solidification were again encountered and were overcome only by the use of special measures that evidently are undesirable for practical purposes. It will be seen that best results were obtained with the later runs beginning with run No. 19 and using procedures (c) and (d). The higher temperature at which the second stage benzene fraction is added in procedure (d) has the advantage that the reaction mixture at this temperature contains substantially less SO₂ than it does at the lower addition temperature of procedure (c), and the smaller evolution of SO₂ which takes place rapidly at this time is often advantageous in plant operations. For this reason procedure (d) is preferred for most purposes, using the proportions of 75–25 or 80–20 for the benzene fractions. It is shown by runs 19, 20 and 23–25 that in both procedures (c) and (d), however, benzene sulfonic acid of 93–95% purity can be produced without any solidification problem and with very little loss.

It will be understood that the invention is not restricted to the details of the foregoing description and examples and that reference should be had to the appended claims for a definition of the limits of the invention.

What is claimed is:

1. In the sulfonation of benzene with sulfur trioxide dissolved in liquid sulfur dioxide to produce benzene sulfonic acid, the steps of dividing the benzene into fractions, reacting one benzene fraction with substantially all of the sulfur trioxide-sulfur dioxide sulfonation medium at a temperature of about −9° C., warming the reaction mixture to a temperature in the range of about 10–20° C., and then adding the remaining benzene thereto, said one benzene fraction being from 50% to 80% of the total benzene.

2. In the sulfonation of benzene with a substantially equimolar quantity of sulfur trioxide dissolved in liquid sulfur dioxide to form benzene sulfonic acid, the steps of dividing the benzene into two fractions one comprising 50–80% and the other 50–20% of the total benzene, sulfonating said one fraction with substantially the entire quantity of sulfur trioxide-sulfur dioxide sulfonation medium at about −9° C., warming the reaction mixture to a temperature in the range of about 10–20° C., and then adding rapidly to the reaction mixture said other benzene fraction comprising the remainder of the total benzene to be sulfonated.

3. A two-stage process for the sulfonation of benzene to produce benzene sulfonic acid which comprises dividing a quantity of benzene to be sulfonated into two fractions one comprising 50–80% and the other 50–20% of said quantity, dissolving an equimolar quantity of sulfur trioxide in liquid sulfur dioxide to form a sulfonation medium, reacting said one benzene fraction with said sulfonation medium in a first sulfonation stage at a temperature of about −9° C., warming the reaction mixture to about 10–20° C., and then rapidly adding said other benzene fraction to the reaction mixture.

4. In the sulfonation of benzene with sulfur trioxide dissolved in liquid sulfur dioxide at atmospheric pressure to produce substantially pure benzene sulfonic acid, the process of maintaining a liquid reaction mixture which comprises reacting 0.5–0.8 mole benzene with one mole of sulfur trioxide dissolved in liquid sulfur dioxide at about −9° C., subsequently evaporating the liquid sulfur dioxide from the system until the temperature reaches 10–20° C. at atmospheric pressure, and adding the remaining 0.5–0.2 mole benzene quickly into this mixture allowing the heat of reaction to raise the temperature to approximately 50–70° C. at which point the sulfonation is complete.

References Cited in the file of this patent

UNITED STATES PATENTS

| | | |
|---|---|---|
| 1,422,564 | Grob | July 11, 1922 |
| 1,970,556 | Carswell | Aug. 21, 1934 |
| 2,704,295 | Gilbert et al. | Mar. 15, 1955 |

OTHER REFERENCES

Leiserson et al.: Ind. and Eng. Chem., vol. 40, pp. 508–10 (1948).